J. WILLIAMS.
VEHICLE WHEEL.
APPLICATION FILED OCT. 23, 1913.

1,180,461.

Patented Apr. 25, 1916.
2 SHEETS—SHEET 1.

WITNESSES:
H. A. Stock
F. P. Schroeder

INVENTOR
John Williams
BY
Harry C. Schroeder
ATTORNEY

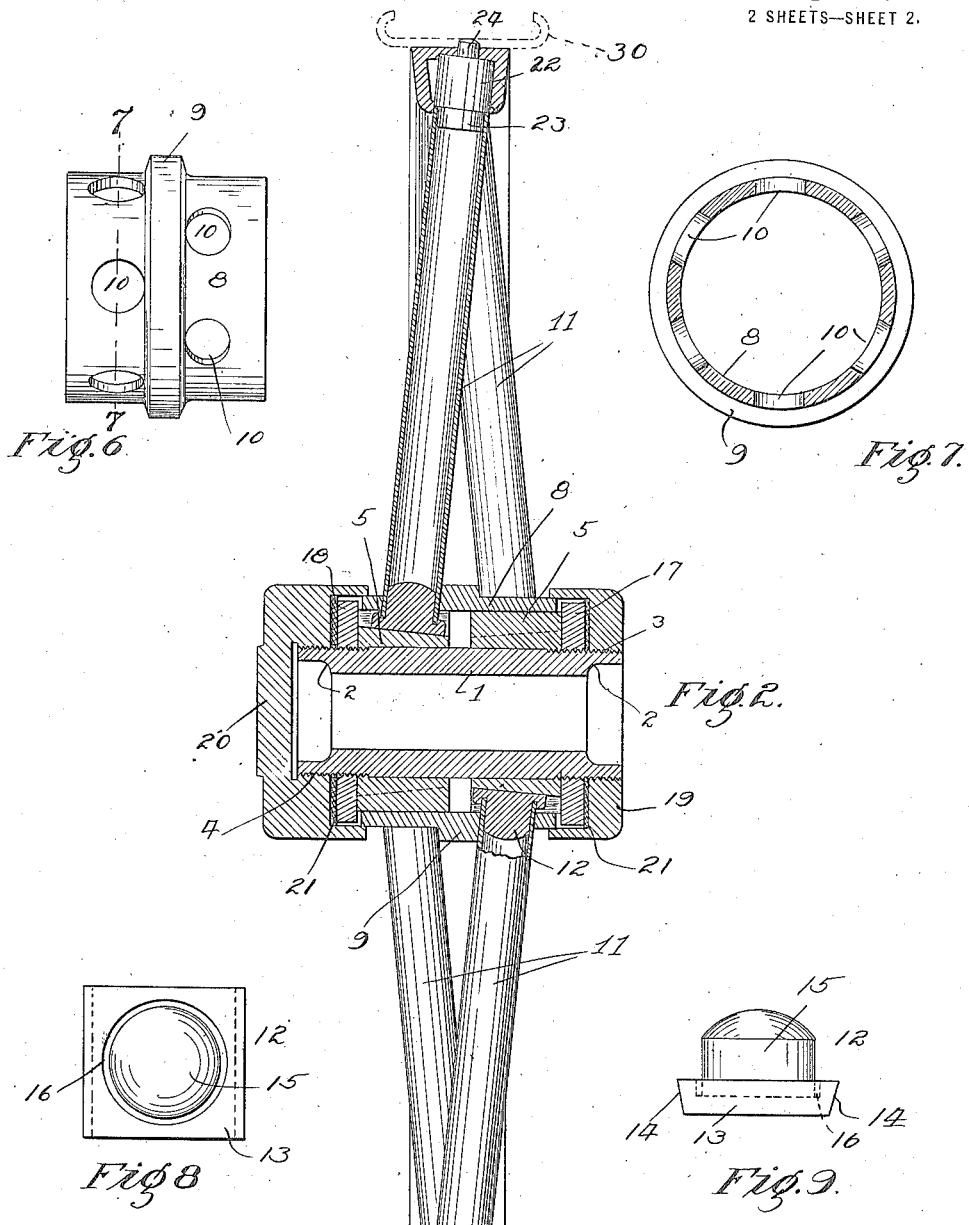

UNITED STATES PATENT OFFICE.

JOHN WILLIAMS, OF OAKLAND, CALIFORNIA, ASSIGNOR OF ONE-HALF TO ROSS CAMPBELL, OF SANTA ROSA, CALIFORNIA.

VEHICLE-WHEEL.

1,180,461.   Specification of Letters Patent.   Patented Apr. 25, 1916.

Application filed October 23, 1913. Serial No. 796,960.

*To all whom it may concern:*

Be it known that I, JOHN WILLIAMS, a citizen of the United States, residing at Oakland, in the county of Alameda and State of California, have invented certain new and useful Improvements in Vehicle-Wheels, of which the following is a specification.

This invention relates to improvements in vehicle wheels and more particularly to an all metal wheel especially adapted for use on automobiles.

Among the objects of this device are: the construction of a light weight and rigid wheel, the use of seamless tubing for the spokes and the providing of improved means for holding the same in place. By the use of such tubing a wheel is produced which has solidity of appearance which is lacking in the usual wire spoke wheels With these and other objects in view it will be seen that my invention consists in the novel construction and arrangements of parts, as herein described and illustrated in the accompanying drawings, and as more particularly pointed out in the appended claims.

Figure 1:
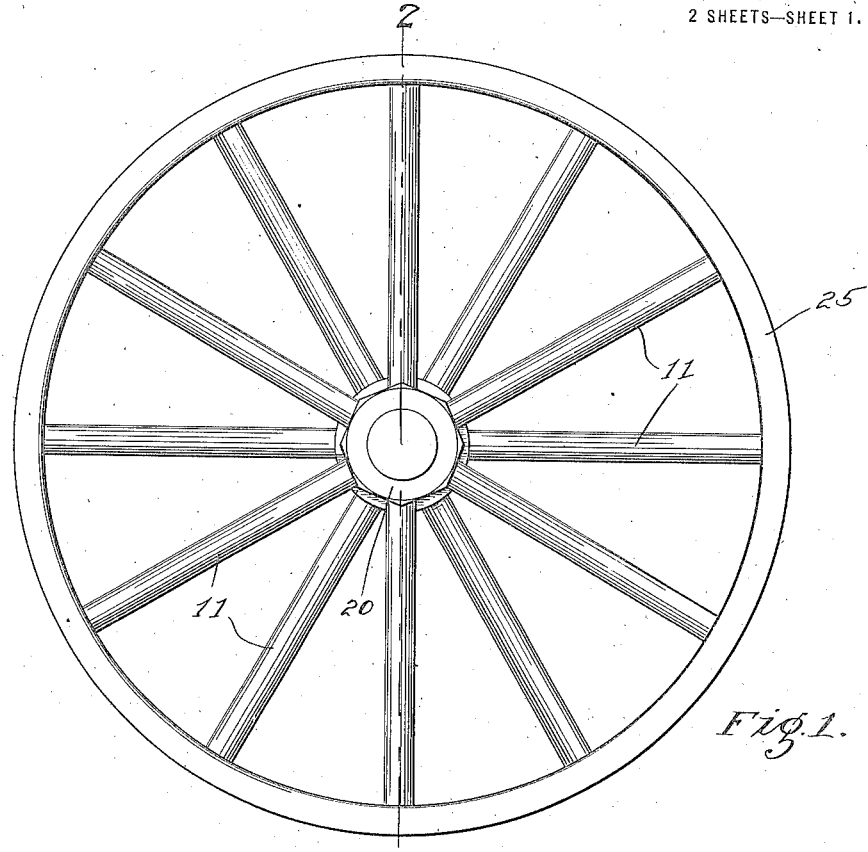
Figure 3:
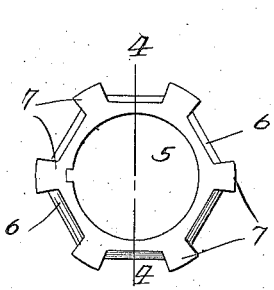
Figure 4:
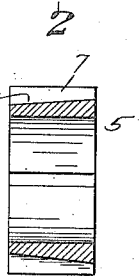
Figure 5:
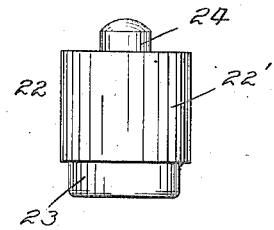

Referring to the accompanying drawings, Figure 1 is a view in elevation of an automobile wheel constructed in accordance with my invention. Fig. 2 is an enlarged sectional view on the line 2—2 Fig. 1, showing the manner in which the spokes are held in the hub and rim. Fig. 3 is a view in elevation of one of the wedge like members on which the inner ends of the spokes are seated. Fig. 4 is a view in section on the line 4—4 Fig. 3. Fig. 5 is a view in elevation of one of the members used to hold the outer end of the spoke in the rim. Fig. 6 is a view in side elevation of a form of spider used in the hub to hold the spokes in spaced relation. Fig. 7 is a view in section on the line 7—7 Fig. 6. Fig. 8 is a view in plan of one of the members which form seats for the inner ends of the spokes. Fig. 9 is a detailed view in elevation of one of the plugs such as is shown in Fig. 8.

Denoting corresponding parts by the same numerals of reference, 1 is a cylindrical central hub having the ball faces 2, and the externally threaded ends 3 and 4. The central portion of the outer surface of this cylinder is finished true and forms a seat for the annular wedge shaped members 5, which are illustrated more fully in Figs. 3 and 4, and are provided with a plurality of inclined faces 6, between which are ribs 7. These members are splined to the hub 1, so that while they rotate therewith, they may be given an axial movement, for the purpose of tightening the spokes.

Seated on the periphery of the ribs 7 is a cylindrical piece 8, shown in Figs. 6 and 7, and which is provided with a central circumferential rib 9. On each side of this rib are oppositely disposed holes 10, adapted to receive the spokes and hold the same in spaced relation.

The spokes 11 are made of seamless tubing such as used in bicycle frames, and alternate spokes are oppositely inclined with respect to the plane of the wheel. To the inner end of each spoke is fitted one of the pieces 12 shown in Figs. 8 and 9, consisting of the flat portion 13 having the inclined edges 14 which rest between the ribs 7 of members 5. A cylindrical lug 15 is formed on base 13 which fits inside of the spoke 11, and at the base of this lug is an annular recess 16 in which is held the end of the spoke. As before stated one of these members 12 is placed on each spoke and seated on an inclined face of member 5. The latter may be forced toward each other by nuts 17 and 18 in threaded engagement with 3 and 4 respectively. These nuts are in turn held by caps 19 and 20 also in threaded engagement with the ends 3 and 4. The washers 21 are interposed between the two sets of nuts.

The outer end of spokes 11 are provided with the members 22 shown in Fig. 5, consisting of a cylindrical body 22' having the same diameter as the outside of the tube forming the spoke, a reduced cylindrical portion 23 to fit the inside of the tube, and a small lug 24 which projects through a hole in the felly 25. The latter is formed with an annular recess 26 and sides 27 inclined at the same angle as the spokes. The lug 24 need not be provided on all the members 22, as its function is to prevent movement between the felly and rim 30 as well as to hold the spokes in fixed relation thereto, and in practice it has not been found necessary to use more than four to accomplish this purpose.

In assembling the wheel, spokes 11 are first provided with the end members 12, placed in the holes 10, of spider 8 and then the outer ends slid into the felly. The inner ends are then seated on the rings 5 and the projections slid over the central hub 1. Next the nuts 17 and 18 are screwed in place causing the wedge shaped faces 6 to firmly bind the spokes in position. The caps 19 and 20 act as binding nuts and give a finish to the completed structure, the various nuts being provided with hexagonal or octagonal faces for gripping with wrenches.

While I have shown the preferred embodiment of my invention it will of course be understood that changes in form and minor details of construction may be made without departing from the spirit thereof.

What I claim as new and wish to cover by Letters Patent is:—

1. In a wheel, the combination of a felly of continuous transverse cross section having an inwardly opening outwardly flaring annular recess therein, a plug contacting therewith along one face only, said plug having a reduced projection extending inwardly from the felly, a hollow spoke engaging said projection and set at an angle to the plane of the felly, a hub structure, and means for securing said spoke in said hub structure.

2. In a wheel, the combination with a felly having an inwardly opening, outwardly flaring annular recess therein and having outwardly opening holes communicating with said recess, cylindrical plugs arranged in said recess so as to contact with one side face only thereof, said plugs having pins inserted in said holes and having reduced projections extending inwardly from the felly, hollow spokes embracing said inward projections at the outer ends of the spokes, a hub structure, and means for securing said spokes in said hub structure.

3. In a wheel in combination, a felly, hollow spokes, means for securing said spokes to said felly at an angle to the plane of said felly, a hub structure comprising an apertured ring through which the spokes extend and through which the spokes are otherwise unattached, plugs inserted into the inner ends of said spokes within said ring, said plugs having inner faces square to the spokes but inclined to the plane of the felly, and wedge rings engaging the inner faces of said plugs for securing the spokes in place.

4. In a wheel in combination, a felly, hollow spokes, means for securing said spokes to said felly at an angle to the plane of said felly, a hub structure comprising an apertured ring through which the spokes extend and through which the spokes are otherwise unattached, plugs inserted into the inner ends of said spokes within said ring, said plugs having inner faces square to the spokes but inclined to the plane of the felly, and wedge rings engaging the inner faces of said plugs for securing the spokes in place, said hub structure comprising also an interior bushing on which said rings are mounted, both ends of said bushing being threaded, and nuts on said threaded portions for forcing said rings toward the center of the hub structure.

5. A metal wheel comprising in combination a felly ring of channel shape cross section, two sets of spokes the outer ends of which are seated in said ring, the spokes of the two sets being oppositely inclined to the plane of the felly ring, a hub structure coöperating with the inner ends of said spokes including an integral outer cylinder provided with apertures through which the spokes extend, an inner hub member spaced from said cylinder, oppositely inclined wedge rings between the inner ends of the spokes and said hub member, and means for forcing said wedge rings toward the center of the hub whereby said spokes are pressed outwardly against the felly ring and placed under compression.

6. A metal wheel comprising in combination a felly ring of channel shape cross section, two sets of spokes the outer ends of which are seated in said ring, the spokes of the two sets being oppositely inclined to the plane of the felly ring, a hub structure coöperating with the inner ends of said spokes including an integral outer cylinder provided with apertures through which the spokes extend, an inner hub member spaced from said cylinder, oppositely inclined wedge rings between the inner ends of the spokes and said hub member, and means for forcing said wedge rings toward the center of the hub whereby said spokes are pressed outwardly against the felly ring and placed under compression, said wedge rings having sockets therein for the reception of the inner ends of the spokes.

7. A metal wheel comprising in combination a felly ring of channel shape cross section, two sets of spokes the outer ends of which are seated in said ring, the spokes of the two sets being oppositely inclined to the plane of the felly ring, a hub structure coöperating with the inner ends of said spokes including an integral outer cylinder provided with apertures through which the spokes extend, an inner hub member spaced from said cylinder, oppositely inclined wedge rings between the inner ends of the spokes and said hub member, and means for forcing said wedge rings toward the center of the hub whereby said spokes are pressed outwardly against the felly ring and placed under compression, the inner ends of the spokes having shoe-like plugs inserted therein, said plugs having a portion extending between the inner edge of the spokes and the wedge rings in which is an annular socket for reception of the inner ends of the spokes.

8. A metal wheel comprising in combination a felly ring of channel shape cross section, two sets of spokes the outer ends of which are seated in said ring, the spokes of the two sets being oppositely inclined to the plane of the felly ring, a hub structure cooperating with the inner ends of said spokes including an integral outer cylinder provided with apertures through which the spokes extend, an inner hub member spaced from said cylinder, oppositely inclined wedge rings between the inner ends of the spokes and said hub member, and means for forcing said wedge rings toward the center of the hub whereby said spokes are pressed outwardly against the felly ring and placed under compression, said wedge rings having sockets therein for the reception of the inner ends of the spokes, said wedge rings having cylindrical portions for maintaining the outer cylindrical member in proper spaced relation with respect to the inner hub member.

In testimony whereof I affix my signature in presence of two witnesses.

JOHN WILLIAMS.

Witnesses:
F. P. SCHROEDER,
R. M. OYARZO.